United States Patent [19]
Kohtani et al.

[11] Patent Number: 5,475,475
[45] Date of Patent: Dec. 12, 1995

[54] IMAGE FORMING APPARATUS AND METHOD IN WHICH IMAGE OF A PLURALITY OF ORIGINALS ARE FORMED AT DIFFERENT POSITIONS OF ONE RECORDING SHEET

[75] Inventors: Hideto Kohtani; Masanori Sakai; Masao Watanabe, all of Yokohama; Hiroaki Takeda, Kawasaki; Satoru Kutsuwada, Yokohama; Masafumi Kamei, Tokyo, all of Japan

[73] Assignee: Canon Kabushiki Kaisha, Tokyo, Japan

[21] Appl. No.: 835,973

[22] PCT Filed: Jun. 20, 1991

[86] PCT No.: PCT/JP91/00832

§ 371 Date: Feb. 19, 1992

§ 102(e) Date: Sep. 12, 1991

[87] PCT Pub. No.: WO92/00644

PCT Pub. Date: Jan. 9, 1992

[30] Foreign Application Priority Data

Jun. 22, 1990 [JP] Japan ..................... 2-162937
Jun. 29, 1990 [JP] Japan ..................... 2-169833

[51] Int. Cl.⁶ ............... G03G 15/04; H04N 1/23; H04N 1/393
[52] U.S. Cl. ............... 355/244; 355/202; 355/243; 358/296; 358/401; 358/449; 358/450; 358/451
[58] Field of Search ................. 355/202, 244, 355/200, 243, 208, 313, 209, 311, 40; 358/450, 451, 296, 452, 448

[56] References Cited

U.S. PATENT DOCUMENTS

| | | | |
|---|---|---|---|
| 4,660,961 | 4/1987 | Kuramoto et al. | 355/244 X |
| 4,743,945 | 5/1988 | Ito et al. | 355/244 |
| 4,849,829 | 7/1989 | Maruyama et al. | 358/450 X |
| 5,099,336 | 3/1992 | Moriya | 355/244 X |
| 5,144,452 | 9/1992 | Abuyama | 358/296 |
| 5,191,429 | 3/1993 | Rourke | 358/296 |
| 5,309,245 | 5/1994 | Hayashi et al. | 358/296 |

FOREIGN PATENT DOCUMENTS

| | | | |
|---|---|---|---|
| 369821 | 5/1990 | European Pat. Off. | |
| 60-54563 | 3/1985 | Japan | |
| 61-03159 | 1/1986 | Japan | 355/244 |
| 61-62088 | 3/1986 | Japan | 355/244 |
| 61-59367 | 3/1986 | Japan | 355/244 |
| 1-221981 | 9/1989 | Japan | |
| 1-293367 | 11/1989 | Japan | |
| 2128443 | 4/1984 | United Kingdom | 355/244 |

Primary Examiner—A. T. Grimley
Assistant Examiner—Shuk Y. Lee
Attorney, Agent, or Firm—Fitzpatrick, Cella, Harper & Scinto

[57] ABSTRACT

An image forming apparatus for forming a plurality of images at different positions on a single recording sheet is disclosed. In order to form a plurality of original images on a single recording sheet with a simple operation, the image forming apparatus includes exposure device for exposing an original, magnification input device for inputting an image formation magnification of the original exposed by the exposure device, first size signal generation device for generating a first size signal indicating a size of the original exposed by the exposure device, image forming device for forming an image on the original exposed by the exposure device on the recording sheet at the magnification input by the magnification input device, and for forming a plurality of original images at different positions on the single surface of the single recording sheet, second size signal generation device for generating a second size signal indicating a size of the recording sheet, and control device for determining the number of originals whose images can be formed on the single recording sheet, on the basis of the magnification input by the magnification input device, the first size signal generated by the first size signal generation device, and the second size signal generated by the second size signal generation device.

17 Claims, 8 Drawing Sheets

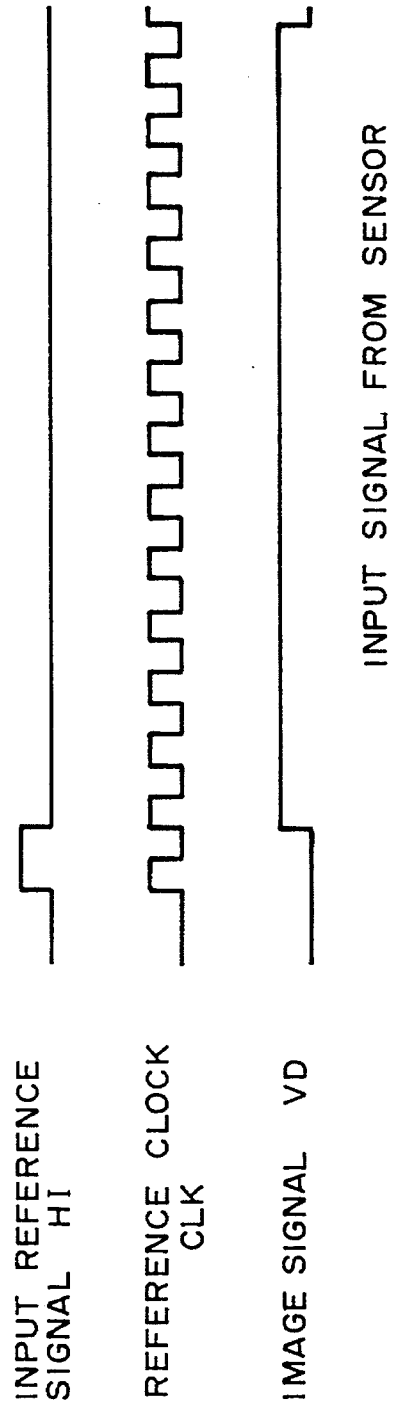
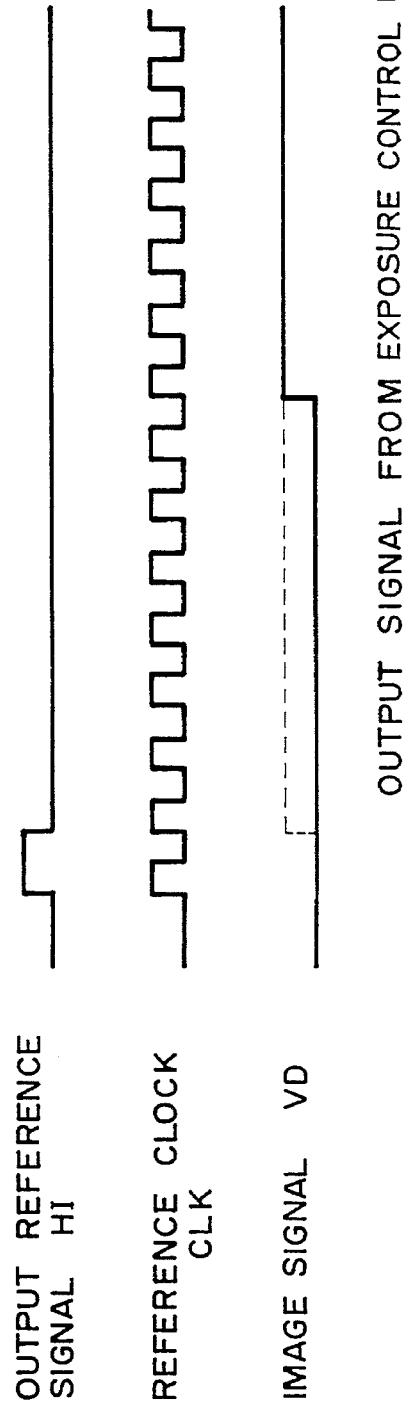

FIG. 7A

| NUMBER OF ORIGINALS | PAPER SIZE | ORIGINAL SIZE | MAGNIFICATION |
|---|---|---|---|
| | A4 | A4 | % |

<REDUCTION · CONTINUOUS COPYING>

END  X

FIG. 7B

| NUMBER OF ORIGINALS | PAPER SIZE | ORIGINAL SIZE | MAGNIFICATION |
|---|---|---|---|
| 4 | A4 | A4 | 50% |

<REDUCTION · CONTINUOUS COPYING>

END  X

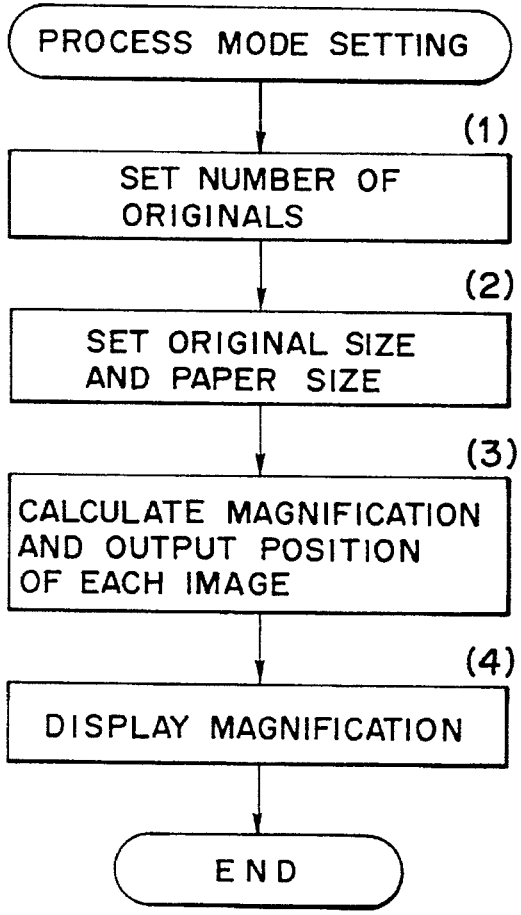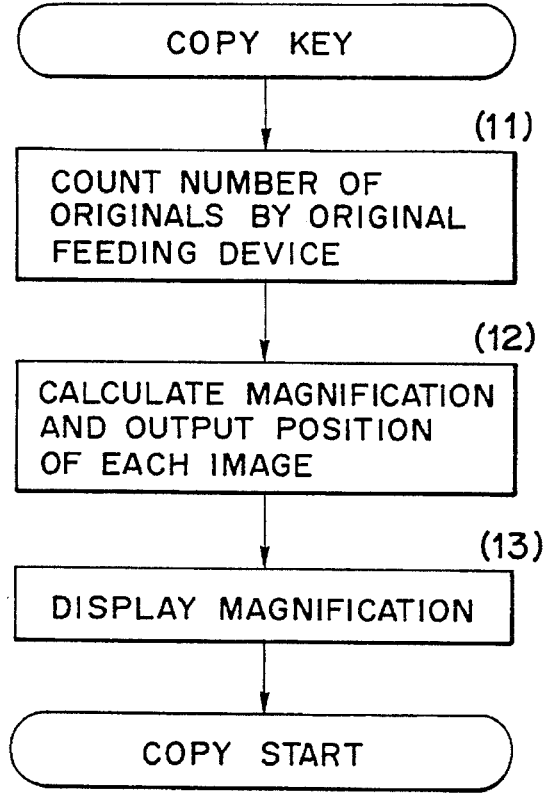

FIG. 10

| <REDUCTION · CONTINUOUS COPYING> | | | |
|---|---|---|---|
| NUMBER OF ORIGINALS | PAPER SIZE | ORIGINAL SIZE | MAGNIFICATION |
|  | A4 | A4 | % |
|  |  |  | END ✗ |

FIG. 11A

| <REDUCTION · CONTINUOUS COPYING> | | | |
|---|---|---|---|
| MAGNIFICATION | PAPER SIZE | ORIGINAL SIZE | NUMBER OF ORIGINALS |
| 100 % | A4 | A4 |  |
|  |  |  | END ✗ |

FIG. 11B

| <REDUCTION · CONTINUOUS COPYING> | | | |
|---|---|---|---|
| MAGNIFICATION | PAPER SIZE | ORIGINAL SIZE | NUMBER OF ORIGINALS |
| 50 % | A4 | A4 | 4 |
|  |  |  | END ✗ |

IMAGE FORMING APPARATUS AND METHOD IN WHICH IMAGE OF A PLURALITY OF ORIGINALS ARE FORMED AT DIFFERENT POSITIONS OF ONE RECORDING SHEET

TECHNICAL FIELD

The present invention relates to an image forming apparatus for forming a plurality of images at different positions on a single recording sheet.

BACKGROUND ART

As a conventional method of outputting a plurality of original images onto a smallest possible number of recording sheets, a method of outputting different images on two surfaces of a sheet, a method of performing a copying operation of a plurality of originals aligned on an original table at a reduced scale, and the like, are employed.

However, the number of standard-size originals, which can be aligned on the original table, is two unless a large-size copying machine is used. The number of images, which can be formed on a single recording sheet is two per surface. In addition, a cumbersome operation for aligning a plurality of originals on the original table must be performed, and whether or not a plurality of original images can fall within a designated recording sheet at a set magnification must be determined.

U.S. patent application Ser. No. 521,674 filed by the present applicant describes a technique in that the number of images to be recorded on a single recording sheet is designated, and desired images are selected from a plurality of images stored in a memory, thereby recording a plurality of images on a single recording sheet. In this application, however, processing for storing original images in the memory, and processing for recording images on a recording sheet must be independently executed, resulting in poor operability upon recording of a plurality of original images on a single recording sheet.

DISCLOSURE OF INVENTION

It is an object of the present invention to provide an image forming apparatus free from the above-mentioned drawbacks.

It is another object of the present invention to provide an image forming apparatus, which can form a plurality of images on a single recording sheet with a simple operation.

It is still another object of the present invention to provide an image forming apparatus, which can detect the number of original images to be formed on a single recording sheet in accordance with a designated copying magnification.

It is still another object of the present invention to provide an image forming apparatus, which can obtain a copying magnification of originals in accordance with the number of originals to be copied on a single recording sheet.

It is still another object of the present invention to provide an image forming apparatus, which can select the types of parameter to be input upon formation of a plurality of original images on a single recording sheet.

Other objects of the present invention will become apparent from the following description taken in conjunction with the accompanying drawings, and the appended claims.

BRIEF DESCRIPTION OF DRAWINGS

FIGS. 5A and 5B are timing charts for explaining input and output operations of image signals;

FIGS. 7A and 7B are views showing setting states of a reduction/continuous copying mode to be displayed on a liquid crystal display unit shown in FIG. 3;

FIG. 8 is a flow chart for explaining an original number designation priority reduction/continuous copying processing sequence;

FIGS. 9A and 9B are flow charts for explaining the original number designation priority reduction/continuous copying processing sequence;

FIG. 10 is a view showing a setting state of the reduction/continuous copying mode to be displayed on the liquid crystal display unit shown in FIG. 3;

FIGS. 11A and 11B are views showing setting states of a magnification priority reduction/continuous copying mode to be displayed on the liquid crystal display unit shown in FIG. 3;

BEST MODE FOR CARRYING OUT THE INVENTION

Figure 1:
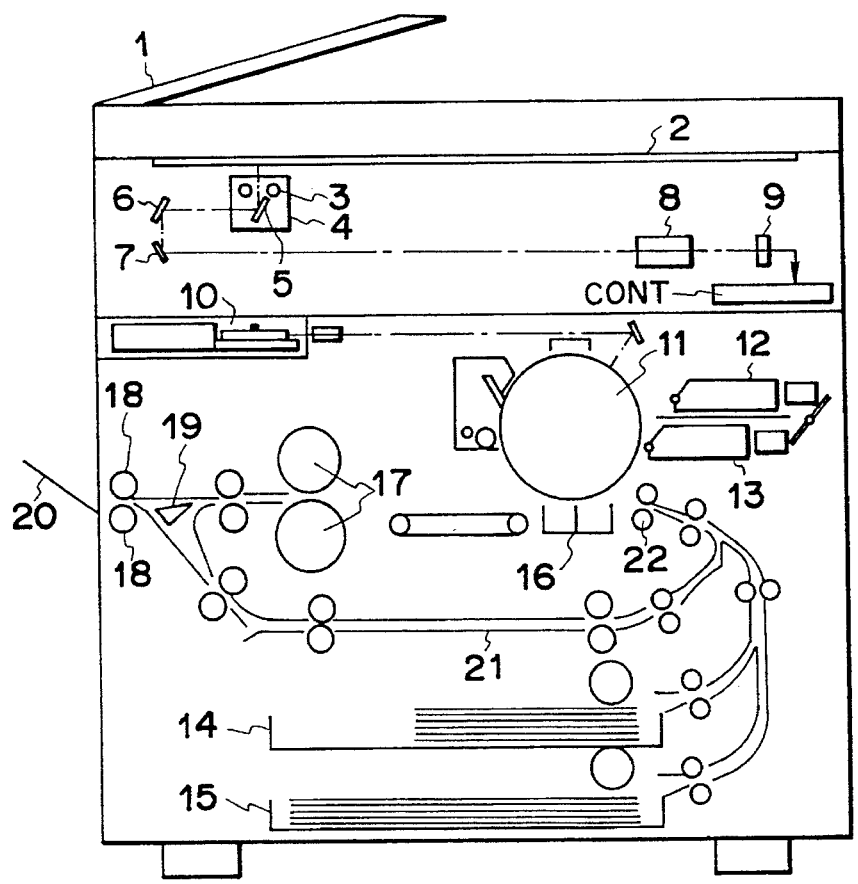
FIG. 1 is a view for explaining an arrangement of an image forming apparatus according to an embodiment of the present invention.

FIG. 1 is a view showing an arrangement of an image forming apparatus according to an embodiment of the present invention. Reference numeral 1 denotes a circulating type document feeder (RDF), which can sequentially feed a plurality of stacked originals one by one to a predetermined position on an original table glass surface 2, and can return the original to a stack position after exposure is ended. The length and width (passage time) of an original can be detected by sensors arranged in an original convey path of the RDF, thereby detecting the size of an original. Reference numeral 4 denotes a scanner constituted by a lamp 3, a scanning mirror 5, and the like. The scanner is reciprocally scanned in a predetermined direction when an original is placed on the original table glass surface 2 by the RDF 1, and focuses light reflected by the original on an image sensor unit 9 through scanning mirrors 5 to 7 and a lens 8.

Reference numeral 10 denotes an exposure control unit comprising a laser scanner, which unit radiates a light beam modulated based on image data output from an image signal control circuit 52 (FIG. 2) of a controller unit CONT onto a photosensitive body 11. Reference numerals 12 and 13 denote developers for respectively visualizing an electrostatic latent image formed on the photosensitive body 11 with developing agents (toners) in predetermined colors (black and red). Reference numerals 14 and 15 denote sheet stack units (cassettes), which can store a stack of standard-size cut sheets. A cut sheet is fed to the position of registration rollers 22 upon a drive operation of a paper feed roller, and is fed again while an image leading end registration timing is synchronized with an image to be formed on the photosensitive body 11.

Figure 2:
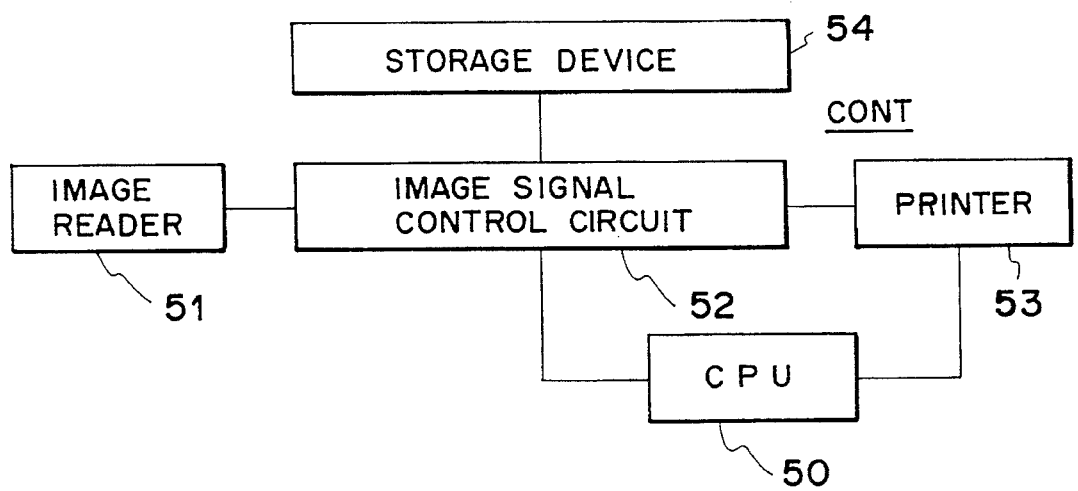
FIG. 2 is a block diagram for explaining an arrangement of a controller unit shown in FIG. 1.

The size of sheets stored in each cassette is detected by a size detector (not shown), and is supplied to a CPU (FIG. 2).

Reference numeral 16 denotes a transfer/peeling charger, which transfers a toner image visualized on the photosensitive body 11 onto a cut sheet, and peels the cut sheet from the photosensitive body 11. The peeled cut sheet is subjected to a fixing operation in a fixing unit 17 via a conveyor belt. Reference numerals 18 denote delivery rollers for delivering and stacking image-formed cut sheets onto a delivery tray 20. Reference numeral 19 denotes a directional flapper for switching a convey direction of an image-formed cut sheet between a direction toward a delivery port and an internal convey direction so as to prepare for a multiple/dual-surface image forming process.

FIG. 2 is a block diagram for explaining an arrangement of the controller unit CONT shown in FIG. 1. Reference numeral 50 denotes a CPU, which incorporates a ROM and a RAM (neither are shown), and systematically controls the respective units on the basis of a control program stored in the ROM.

Reference numeral 51 denotes an image reader, which is constituted by the above-mentioned image sensor unit 9, and the like, and outputs an analog image signal photoelectrically converted by the image sensor 9 to the image signal control circuit 52. Reference numeral 53 denotes a printer for driving the exposure control unit 10 on the basis of a video signal output from the image signal control circuit 52 so as to radiate a light beam onto the photosensitive body 11. Note that the image reader 51 is provided with a scanning panel having keys, indicators, and the like for setting modes necessary for image formation. Note that reference numeral 54 denotes a storage device for storing an image signal.

In the image forming apparatus with the above-mentioned arrangement, a reading operation of an original image is started by the image reader 51, original image data are sequentially stored in the storage device 54, and the image signal control circuit 52 controls read timings of original image data stored in the storage device 54, and image write timings of the printer 53, thereby simultaneously outputting a plurality of original images to be laid out onto a single cut sheet (reduction/continuous copying). In this manner, a desired number of original images are output to be laid out on a single cut sheet.

When another reduction/continuous copying mode is designated by a key 113 arranged on an operation panel (to be described later) to instruct the image reader 51 to start an image reading operation, the RDF 1 automatically feeds originals to an exposure position, and sequentially automatically reads original images.

When the number of originals or an image formation magnification is designated at the operation panel, the CPU 50 calculates a magnification or the number of cut sheets on the basis of the designated number of originals or image formation magnification so as to simultaneously output a plurality of original images to be laid out on a single cut sheet, and displays the magnification value or the number of cut sheets as the calculation result on a display means of the operation panel.

Figure 3:
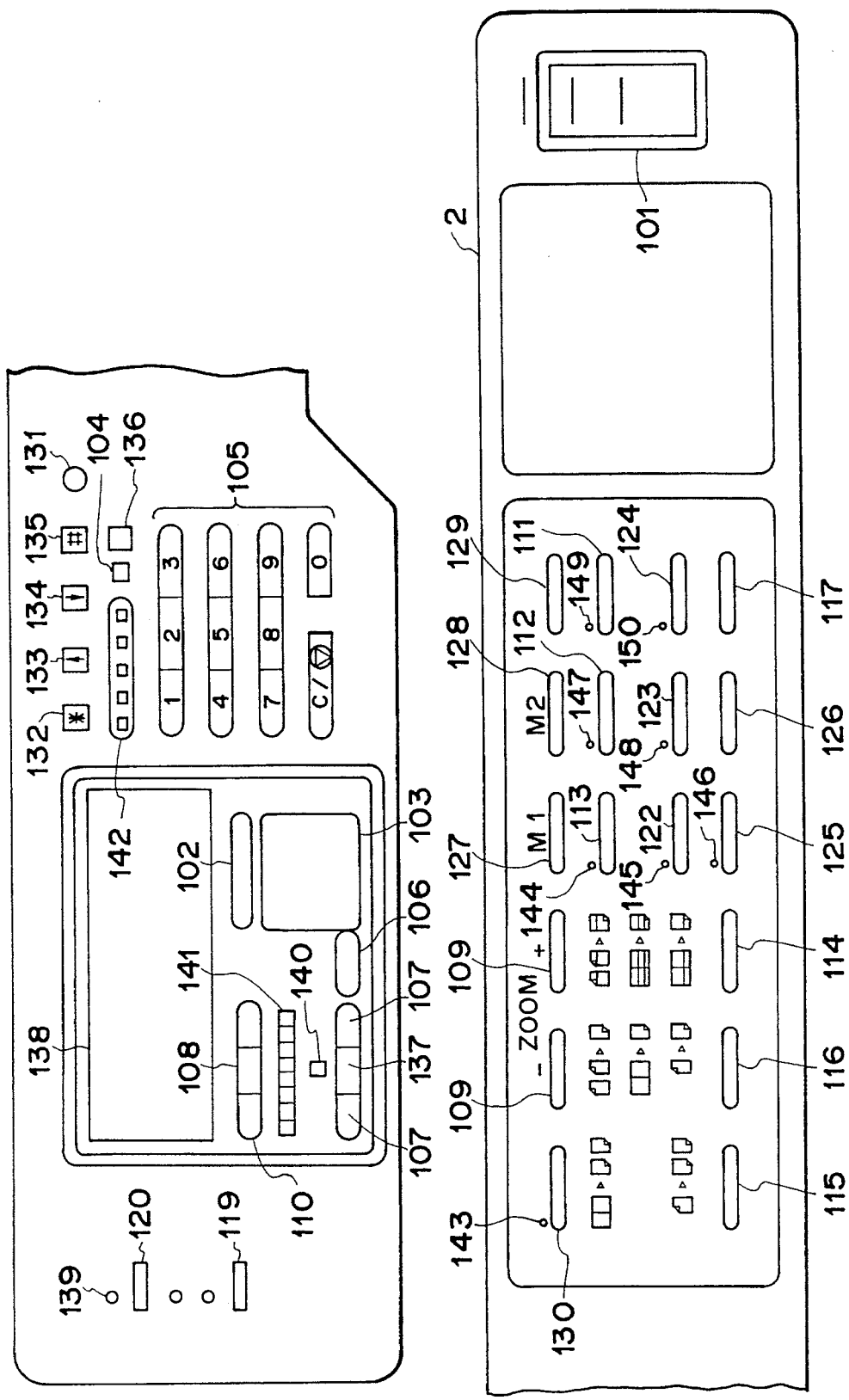
FIG. 3 is a plan view showing an example of an operation panel provided to an image reader shown in FIG. 2.

FIG. 3 is a plan view showing an example of the operation panel provided to the image reader 51 shown in FIG. 2.

In FIG. 3, reference numeral 101 denotes a power switch for controlling energization to the image forming apparatus. Reference numeral 102 denotes a reset key, which serves as a key for resuming a standard mode in a standby state. Reference numeral 103 denotes a copy key. Reference numeral 104 denotes a developer selection/switching key. With this developer selection/switching key 104, one of the developers 12 and 13 is selectively switched. Reference numeral 105 denotes a ten-key pad for mainly inputting a copy count. Reference numeral 136 denotes an identification number input key. This identification number input key 136 allows specific operators to perform a copying operation, and inhibits a copying operation by operators other than the specific operators unless an identification number is input.

Reference numeral 106 denotes a key for selecting one of the cassettes 14 and 15; 107, copy density adjusting keys; 108, a key for selecting an equal-magnification copying mode; 109, zoom keys for designating a copying magnification in units of predetermined magnifications, e.g., 1%; 130, an auto variable magnification key for automatically performing enlargement or reduction in correspondence with the size of a transfer sheet; 110, a standard magnification key for designating standard reduction or standard enlargement magnification; 111, a key for designating a frame erase mode of a transfer sheet; 112, a key for designating formation of a binding margin at one end of a copying sheet; 113, a key for designating the reduction/continuous copying mode; 125, an area designation key for performing an area designation; 126, an area call key for partially correcting a content of an area set by the area designation key 125; 117, a guide key for knowing the contents of the respective functions; and 131, a preheat mode key for setting a preheat mode.

Reference numeral 114 denotes a multiple key for selecting a multiple mode; 115, a continuous copying key for designating a continuous copying mode for splitting the copying region of the original table glass surface 2 into two right and left regions, and performing continuous copying operations for automatically copying two copying regions; 116, a key for selecting a dual-surface copying mode; and 119 and 120, keys for designating operations of a sorter (not shown). Reference numerals 122, 123, and 124 denote keys for designating modes for writing predetermined character data in a copied image. These keys 122, 123, and 124 are respectively used for designating a date write mode, a memo write mode, and a number write mode. Reference numerals 127 and 129 denote mode memory keys for storing set copying modes. These keys can store three copying modes $M_1$ to $M_3$.

Reference numeral 138 denotes a liquid crystal display unit (display), comprising a liquid crystal display element, for displaying a copy count, a transfer sheet, a set magnification, a message, and the like. Reference numerals 139 to 150 denote indicators comprising LEDs (light-emitting diodes). More specifically, reference numeral 139 denotes a sorter use indication LED for indicating a sort mode, a group mode, or the like when the sorter is used.

Reference numeral 140 denotes an automatic exposure control indicator which is turned on when an automatic exposure control (AE) key 137 is depressed; 141, density indicators corresponding to the copy density adjusting keys 107; and 142, indicators for, when the color developer selection/switching key 104 is depressed to select a developer in the main body or in a developer storing device as optional equipment, turning on a color indication corresponding to the color of the selected developer.

Reference numeral 143 denotes an auto variable magnification indicator for indicating depression of the auto variable magnification key 130; 144, a reduction/continuous copying mode indicator; 145, a date write mode indicator; 146, an area designation indicator; 147, a binding margin mode indicator; 148, a memo write mode indicator; 149, a frame erase mode indicator; and 150, a number write mode indicator. Reference numeral 132 denotes an asterisk key; 133 and 134, selection keys; and 135, an enter key.

Reduction/continuous copying processing for copying a plurality of original images onto a single cut sheet according to the present invention will be described below with reference to FIG. 4 and FIGS. 5A and 5B.

Figure 4:
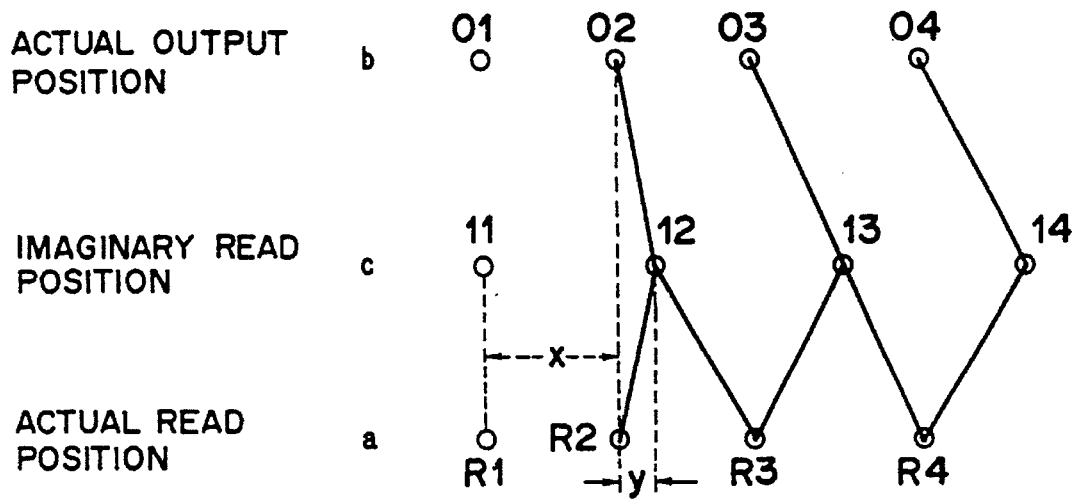
FIG. 4 is a view for explaining an image information reduction principle in a main scanning direction.

FIG. 4 is a view for explaining an image information reduction principle in the main scanning direction. In FIG. 4, ⓐ indicates an actual read position; ⓑ indicates an actual output position; and ⓒ indicates an imaginary read position. Note that FIG. 4 corresponds to a case wherein an image is reduced to x/(x+y) % in the main scanning direction, where x is the interval between reading elements of the image sensor 9, and the magnification changes according to the value y.

FIGS. 5A and 5B are timing charts for explaining an operation of FIG. 1.

In these figures, reference symbol H1 denotes an input reference signal serving as a horizontal synchronization signal. Reference symbol CLK denotes a reference clock; and VD, an image signal.

Processing for copying an original image on a cut sheet at a reduced scale will be described below.

As for the subscanning direction, the image signal VD is read from the image reader 51 at constant timings. Thus, the moving speed of the scanner 4 for illuminating an original is increased to increase the area of an original to be read by the image reader 51 in a unit time. Therefore, an image can be reduced in a paper convey direction (subscanning direction).

On the other hand, as for the main scanning direction, read/write processing of the image signal VD is controlled through the image signal control circuit 52.

More specifically, in the main scanning direction, when no reduction is made, as shown in FIG. 4, no problem is posed since the actual output position ⓑ and the actual read position ⓐ correspond to each other. However, when an image is reduced to x/(x+y) %, processing is made under an assumption that an image signal is input at the imaginary read position ⓒ. An image can be reduced by outputting image data at this position to the actual output position ⓑ. Since an image at the imaginary read position corresponds to two actual read positions, an image density at the imaginary read position ⓒ is predicted by linear interpolation of the density values of image signals read at the two actual read positions ⓐ on the basis of the following equation (1). Note that R2 and R3 indicate the densities of images read at the actual read positions.

$$O2 = \{R3 \times y + R2 \cdot (y-x)\}/y \quad (1)$$

Reduction/continuous copying processing will be described below with reference to FIG. 6.

Figure 6:
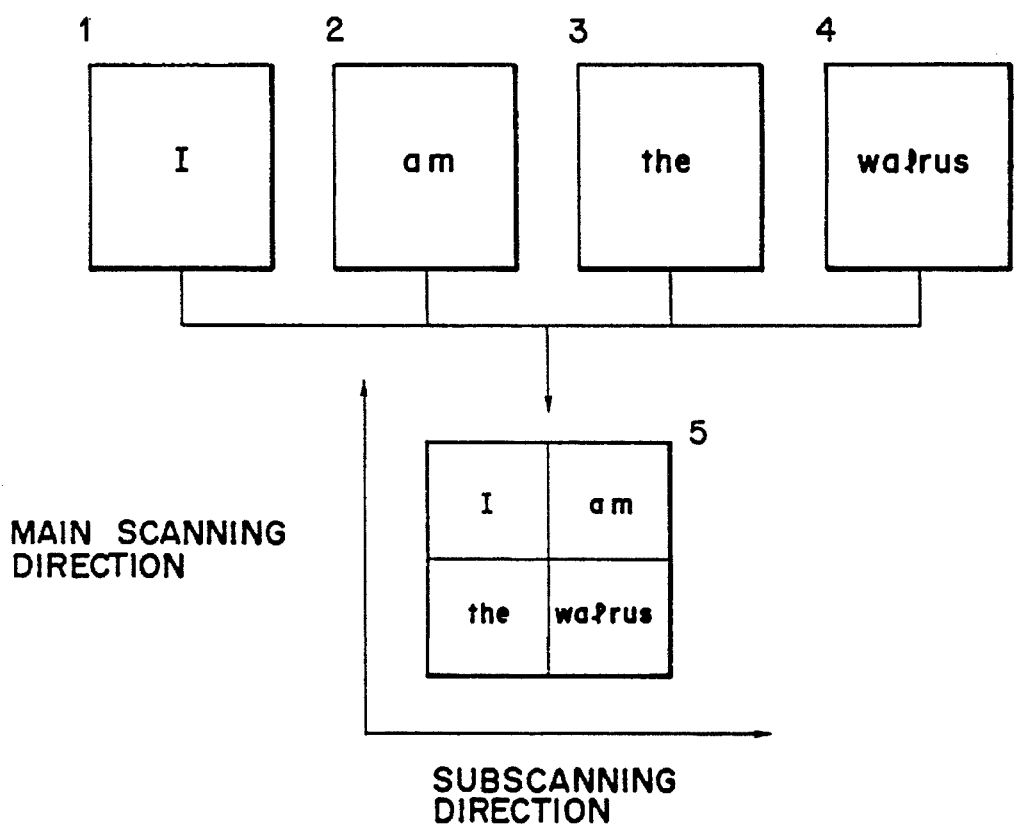
FIG. 6 is a schematic view for explaining reduction/continuous copying processing.

FIG. 6 is a view for explaining reduction/continuous copying processing for copying a plurality of original images onto a single cut sheet. In FIG. 6, ① to ④ respectively indicate, e.g., A4-size originals, and ⑤ indicates, e.g., an A4-size sheet on which four original images are copied at a reduced scale.

The reduction/continuous copying mode is informed to the CPU 50 upon depression of the reduction/continuous copying mode key 113 shown in FIG. 3. Thereafter, the originals ① to ④ are set on the RDF 1, and the copy key 103 is then depressed. The RDF conveys the originals ① to ④ in turn onto the original table glass surface 2, and reads images using the image sensor unit 9. At this time, the scanner 4 is moved at a speed twice that in an equal-magnification mode, and images are read while being reduced in the subscanning direction according to the above-mentioned reduction algorithm.

Image signals reduced in the subscanning direction are not directly supplied to the printer 53, but are stored in the storage device 54. When all the original images are read and stored at the reduced scale, the image forming process is started. When exposure control is performed while reading out the image signals from the storage device 54, image data are read out in the order for forming images like the sheet ⑤ shown in, e.g., FIG. 6. More specifically, after main scanning signals for one line of the original ③ are read out, signals for one line of the original ① are subsequently read out. Upon completion of image outputs for all the lines of the originals ① and ③, signals are output in the order of the first line of the original ④, the first line of the original ②, and so on. A latent image is formed in this manner, and is developed, fixed, and delivered. With these operations, the images of the originals ① to ④, which images are equally reduced according to the number of read originals, can be formed on a single transfer sheet. In the above description, images of four originals are output to a single sheet. In the case of nine originals or 16 originals, a plurality of originals can be similarly formed on a single recording sheet by changing the reduction magnification.

In the above description of the embodiment, images are automatically reduced in size in accordance with the number of originals input from the RDF 1, and are formed on a single transfer sheet. Alternatively, a reduction magnification of each original image may be calculated by the CPU 50 in accordance with the number of originals designated at the ten-key pad 105 shown in FIG. 3 and the original size, and may be displayed on the liquid crystal display unit 138.

An original number designation priority reduction/continuous copying operation will be described below with reference to FIGS. 7A and 7B, and FIG. 8.

FIGS. 7A and 7B are views showing reduction/continuous copying mode setting states displayed on the liquid crystal display unit 138 shown in FIG. 3.

FIG. 8 is a flow chart for explaining a processing sequence of an original number designation priority reduction/continuous copying mode. Note that (1) to (4) indicate steps.

When the reduction/continuous copying key 113 is depressed on the operation panel shown in FIG. 3, the reduction/continuous copying mode is set, and this flow chart is started.

A frame shown in FIG. 7A is displayed on the liquid crystal display unit 138. The number of originals is set using the ten-key pad 105 (1), and an original size is set by operating the zoom keys 109 (2). Note that a paper size is selected by the paper size selection key 106. The CPU 50 calculates a maximum reduction magnification, at which the set number of original images can be copied without overlapping each other, and also calculates output positions of the original images (3). The CPU displays the calculated magnification on the liquid crystal display unit 138 (4), as shown in FIG. 7B, so that a user can recognize a reduction state in an original layout-output mode. Setting processing is ended when the asterisk key 132 is depressed.

Upon an input of the copy key 103, images reduced at the magnification calculated in units of the set number of originals are output to be laid out to the output positions shown in FIG. 6.

In the above embodiment, the original number designation priority reduction/continuous copying processing operation has been described. However, reduction magnification designation priority processing may be performed, and the maximum number of originals, which can be copied on a single cut sheet, may be displayed.

In the above description of the embodiment, the number of originals is set by the ten-key pad 105, and the magnification value is displayed. Alternatively, the number of originals may be counted and an original size may be detected by circulating originals using the RDF 1 shown in FIG. 1, and a magnification may be automatically calculated and displayed.

FIGS. 9A and 9B are flow charts for explaining an original number designation priority reduction/continuous copying processing sequence in the image forming apparatus according to the present invention. Note that (1) and (11) to (13) indicate steps.

When the reduction/continuous copying key 113 is input, the reduction/continuous copying mode is set (1), and a display is made on the liquid crystal display unit 138, as shown in FIG. 10. At this time, the column of the number of originals is filled with "auto" since the number of originals is automatically counted by the RDF 1 after the copy key 103 is input. The above-mentioned flow may be started upon an input from the ten-key pad 105. In this case, different magnification display processing operations according to a user's favor may be automatically started. Since the RDF 1 comprises a mechanism for detecting an original size (i.e., the original size is detected based on the feed distance and the width), a user need only set an output paper size.

When the copy key 103 is depressed, processing shown in FIG. 9B is started. The RDF 1 counts the number of originals (11). Upon completion of counting of the number of originals, the CPU 50 calculates a maximum magnification at which the set originals can be output to be laid out onto a single cut sheet without overlapping each other, and also calculates output positions of images (12). The CPU causes the liquid crystal display unit 138 to display the magnification (13), and then starts copy processing.

FIGS. 11A and 11B are views showing setting states of a magnification priority reduction/continuous copying mode.

Figure 12:
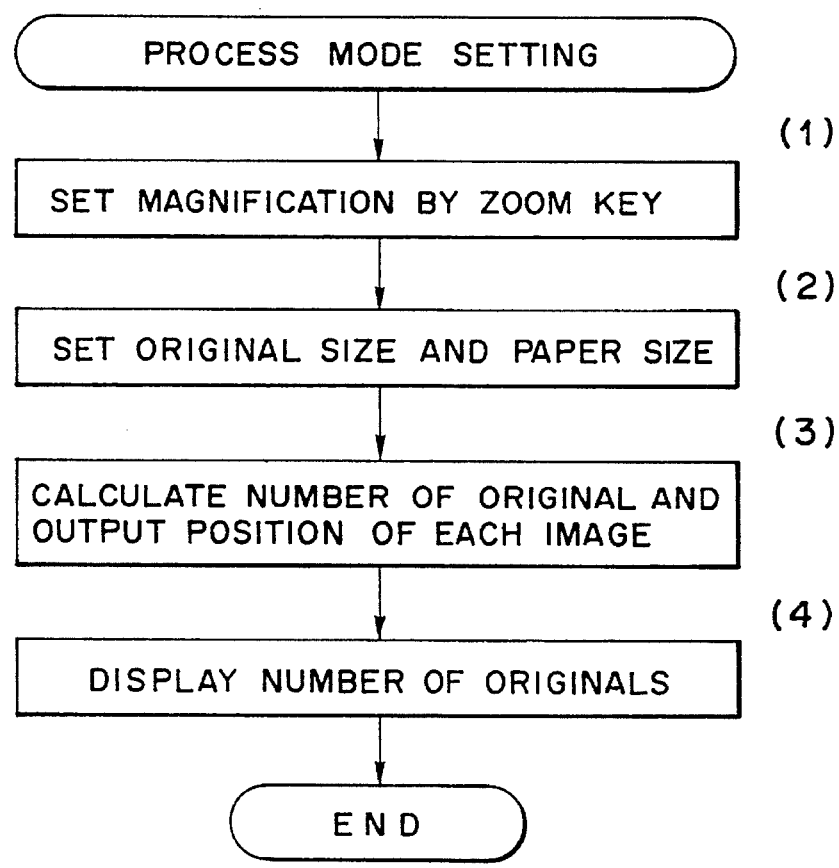
FIG. 12 is a flow chart for explaining a reduction magnification priority reduction/continuous copying processing sequence.

FIG. 12 is a flow chart for explaining a processing sequence of a reduction magnification priority reduction/continuous copying mode. Note that (1) to (4) indicate steps.

When the reduction/continuous copying key 113 is depressed on the operation panel shown in FIG. 3, the reduction/continuous copying mode is set, and this flow chart is started.

A frame shown in FIG. 7A is displayed on the liquid crystal display unit 138. A magnification is then set by the zoom keys 105 (1). A cursor is moved to a portion of an original size using the keys 134 and 135, the original size is set using the zoom keys 109, and an output paper size is set by operating the cassette selection key 106 (2). The CPU 50 calculates the number of originals, which allows image formation on a selected sheet at the magnification set by the zoom keys 109, and the output positions of the originals (3). The calculated maximum number of originals to be input is displayed (4), as shown in FIG. 11B, so that a user can recognize a reduction state in the reduction/continuous copying mode. When the asterisk key 132 indicating the end of processing is depressed, the setting processing is ended.

In this embodiment, the original size can also be detected using the document feeder. Then, an operator need only input a paper size and a magnification.

In the above description of the embodiment, the maximum number of originals for the desired magnification designated by the zoom keys 109 is displayed. In this manner, the number of originals for various magnifications can be displayed according to a user's favor. However, the ratio of an output sheet size and an original size must always be calculated. Thus, when the reduction/continuous copying key 113 is depressed, a predetermined magnification may be automatically set upon an instruction from the standard magnification key 110.

When A4-size original images are simultaneously output to an output sheet, predetermined relationships, i.e., four original images can be simultaneously copied at a magnification of 50%; nine original images at 33%; 16 original images at 25%; and so on are established. Therefore, every time the standard magnification key 110 is input, the magnifications may be displayed in rotation to eliminate a magnification setting load on a user. Thus, magnification setting processing can be simplified, and the maximum number of originals to be input can be easily grasped.

In the above description of the embodiment, a plurality of original images are laid out and output in a single transfer process. However, a plurality of original images may be formed on a single surface of a single sheet in a multiple transfer process to obtain the same effect as described above.

More specifically, when image data of originals are output from the image reader 51, images are formed at predetermined positions of a conveyed single sheet in the multiple transfer process, while the image signal control circuit 52 controls the output timings of the original image data, as will be described later. In this manner, a large number of original images can be formed at a reduced scale on a single surface of a single sheet in the multiple process.

The multiple transfer process will be described below.

A sheet subjected to the fixing operation in the fixing unit 17 is conveyed to a re-feed sheet stack unit 21 by the directional flapper 19 for switching the convey direction. When the next original is set at an exposure position, an original image is read in the same manner as in the above-mentioned process. In this case, since the sheet is fed from the re-feed sheet stack unit 21, images are consequently multiple-transferred onto the single sheet. Therefore, upon repetition of this process, a plurality of original images can be output onto the single sheet to overlap each other.

Processing for forming an original image at a predetermined position on a sheet will be described below.

This image forming apparatus can independently control the start timing of the image reader 51 and the sheet convey timing. The start timing of the image reader 51 is managed by the CPU 50. A timing for registering the leading ends of a toner image on the photosensitive body and a sheet is also controlled by the registration rollers 22 through the CPU 50. In this manner, an image can be moved to a desired position in the convey direction (subscanning direction) of a recording sheet by adjusting the paper feed timing of the registration rollers 22.

Timing control in a direction (main scanning direction) perpendicular to the convey direction is attained by adjusting an emission timing of a light signal output from the exposure control unit 10 with respect to an image signal read by the image sensor unit 9. More specifically, an image signal VD is fetched in synchronism with an input reference signal H1 shown in FIG. 5A and in response to a reference clock CLK. When an image is to be output without being moved, the image signal VD can be output in synchronism with an output reference signal H1 and in response to the reference clock CLK, as indicated by a dotted line in FIG. 5B.

When an image is to be moved, the image signal control circuit 52 changes the output timing of an image signal with respect to the output reference signal H1, as shown in FIG. 5B, thereby forming an image at a desired position on a sheet.

The reduction/continuous copying processing in the multiple transfer process will be described below.

When the reduction/continuous copying key 113 shown in FIG. 3 is depressed, a frame shown in, e.g., FIG. 7A is displayed on the liquid crystal display unit 138. The number of originals is then set by operating the ten-key pad 105, and an original size is set by operating the zoom keys 109. Furthermore, a paper size is set by operating the cassette selection key 106. Upon completion of these setting operations, the CPU 50 calculates a maximum magnification at which original images corresponding to a set count can be formed without overlapping each other, and also calculates the output positions of the original images. The magnification calculated in this manner is displayed on the liquid crystal display unit 138, as shown in FIG. 7B, thus presenting the reduction magnification to a user in advance.

When the asterisk key 132 is input, the control then waits for an input of the copy key 103.

As shown in FIG. 6, originals ① to ④ are set on the RDF 1, and the copy key 103 is depressed. At this time, if four original images are to be output onto a recording sheet having the same size as the original, a copying magnification of 50% is proper. The RDF 1 sequentially conveys the originals onto the original table glass surface, and original images are read by the image sensor unit 9. At this time, the scanner 4 is moved at a speed twice that in the equal-magnification mode, thereby reducing original images in the above-mentioned reduction process. The original image reduced to 50% is output to the corresponding position of a layout-output sheet ⑤ shown in FIG. 6 upon execution of the above-mentioned image shift processing in a single image forming process. When the multiple transfer process is executed a plurality of times corresponding to the number of originals (e.g., four times), the sheet ⑤, on which the images on the four originals ① to ④ are copied at a reduced scale, can be obtained. In the above embodiment, four original images are copied onto a single sheet. Even when the number of originals is increased to 9, 16, . . . , these original images can be copied onto a single sheet by repeating the same multiple transfer processing.

In this embodiment, as described above, the RDF can count the number of originals, and detects an original size. Therefore, an operator need only designate a paper size.

When the RDF 1 is used in the magnification designation priority reduction/continuous copying mode, images stored in the storage device may be read out to form images on a sheet every time a calculated number of originals are fed. In this manner, a large number of originals may be stacked on the RDF. The same applies to a case wherein the multiple transfer process is performed.

In each of the above embodiments, the number of originals is calculated based on a recording sheet size, a magnification, and an original size, or a magnification is calculated based on the number of originals, an original size, and a recording sheet size. In addition, a recording sheet size may be calculated based on the number of originals, an original size, and a magnification, thereby selecting a recording sheet.

Figure 13:
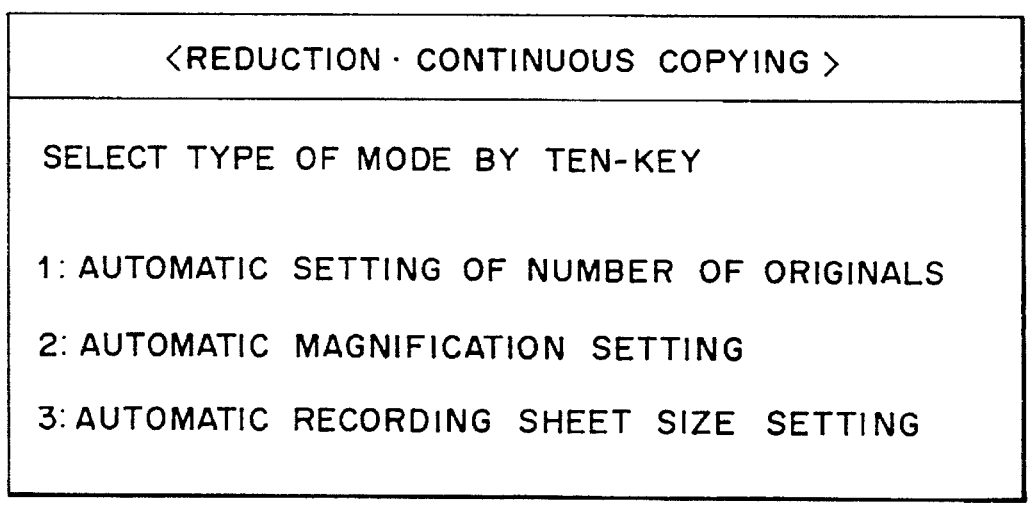
FIG. 13 is a view showing a setting screen for designating a type of reduction/continuous copying mode.

In the above-mentioned reduction/continuous copying mode, a method of calculating the number of originals, a method of calculating a magnification, and a method of calculating a recording sheet size are available. In this case, one of these methods may be selected upon selection of the reduction/continuous copying mode. More specifically, when the reduction/continuous copying key 113 is depressed, a display shown in FIG. 13 is made to allow selection of the type of reduction/continuous copying mode. When a desired reduction/continuous copying mode is input using the ten-key pad in this case, a parameter setting frame is displayed to wait for inputs.

In each of the above embodiments, an original size is input from the operation unit or is detected by the RDF. However, an original size may be detected based on an image signal output from the image sensor 9.

We claim:

1. An image forming apparatus including:

exposure means for exposing an original;

magnification input means for inputting an image formation magnification of the original exposed by said exposure means;

first size signal generation means for generating a first size signal indicating a size of the original exposed by said exposure means;

image forming means for forming an image of the original exposed by said exposure means on a recording sheet at the magnification input by said magnification input means, said image forming means forming a plurality of original images at different positions on a single surface of a single recording sheet;

second size signal generation means for generating a second size signal indicating a size of the recording sheet; and control means for determining number data indicating how many originals can be formed by said image forming means on the single recording sheet, Ion the basis based on the magnification input from said magnification input means, the first size signal generated by said first size signal generation means, and the second size signal generated by said second size signal generation means.

2. An image forming apparatus according to claim 1, further including feed means for feeding a plurality of originals to an exposure position one by one, and wherein said first size signal generation means detects an original size during an original feed operation by said feed means.

3. An image forming apparatus according to claim 1, said exposure means comprises conversion means for converting an original image into an image signal expressed by an electrical signal, and wherein said image forming means forms an image based on the image signal converted by said conversion means.

4. An image forming apparatus according to claim 3, further including storage means for storing the image signal converted by said conversion means, and wherein said control means causes said image forming means to start image formation after image signals of originals corresponding to the number data are stored in said storage means.

5. An image forming apparatus comprising:

exposure means for exposing an original;

number data generation means for generating number data indicating how many originals whose images are to be formed on a single recording sheet;

first size signal generation means for generating a first size signal indicating a size of the original exposed by said exposure means;

second size signal generation means for generating a second size signal indicating a size of the recording sheet;

determining means for determining magnification to form images of the originals at different positions on a single recording sheet, based on the number data generated by said number data generation means, the first size signal generated by said first size signal generation means, and the second size signal generated by said second size signal generation means;

image forming means for forming the images of the originals with the magnification determined by said determining means at a desired position on the single recording sheet;

feeding means for feeding the single recording sheet to the image forming means after the image is formed on the single recording sheet by said image forming means, in order to form another image on the single recording sheet; and control means for repeatedly controlling said exposure means, said image forming means and said feeding means so as to form reduced images of each of the images of the plurality of originals at different positions on the single recording sheet which is repeatedly fed by said feeding means.

6. An image forming apparatus according to claim 5, wherein said feeding means further includes means for feeding a plurality of originals to an exposure position one by one, and wherein said number data generation means detects the number of originals when said feeding means feeds the originals.

7. An image forming apparatus according to claim 5, wherein said feeding means includes means for feeding a plurality of originals to an exposure position one by one, and wherein said first size signal generation means detects an original size during an original feed operation by said feeding means.

8. An image forming apparatus according to claim 5, wherein said exposure means comprises conversion means for converting an original image into an image signal expressed by an electrical signal, and wherein said image forming means forms an image based the image signal converted by said conversion means.

9. An image forming apparatus according to claim 8, further including storage means for storing the image signal converted by said conversion means, and wherein said control means causes said image forming means to start image formation after image signals of originals corresponding to the number data are stored in said storage means.

10. An image forming apparatus according to claim 5, wherein said control means causes said image forming means to perform image formation of a first original on a recording sheet, then causes said exposure means to expose a second original, and causes said image forming means to perform image formation of the second original on the same recording sheet.

11. An image forming apparatus comprising:

exposure means for exposing an original;

number data generation means for generating number data indicating how many originals whose images are to be formed on a single recording sheet;

first size signal generating means for generating a first size signal indicating a size of the original exposed by said exposure means;

magnification input means for inputting an image formation magnification of the original exposed by said exposure means;

image forming means for forming images of originals corresponding to the number data generated by said number data generation means at the magnification input by said magnification input means at different positions on a single surface of a single recording sheet; and control means for determining which size of the recording sheet allows said image forming means to form the images of the originals thereon, based on the number data generated by said number data generation means, the first size signal generated by said first size signal generation means, and the magnification input by said magnification input means.

12. An image forming apparatus comprising:

exposure means for exposing an original;

image forming means for forming an image of the original exposed by said exposure means, on a recording sheet;

first selection means for selecting a first mode in which images of a plurality of originals are formed at different positions of one side of a single recording sheet;

second selection means for, when said first mode is selected by said first selection means, selecting a second mode which automatically determines how many images of the originals are to be formed on the single recording sheet, or a third mode which automatically determines image formation magnification of the images of the originals; and display means for, in response to a selection result of said second selection means, displaying a request of input of parameters which are necessary to form the images of the originals at the different positions of the one side of the single recording sheet.

13. An apparatus according to claim 12, further comprising input means for inputting said parameters.

14. An apparatus according to claim 12, wherein said display means displays a request to input image formation magnification when said second mode is selected by said second selection means and wherein said display means displays a request to input a number of the originals when said third mode is selected by said second selection means.

15. An apparatus according to claim 12, further comprising control means for determining number data for originals based on image formation magnification, sizes of the originals and size of the recording sheet when said second mode is selected by said second selection means, and for determining image formation magnification which allows the images of the originals to be formed on the single recording sheet based on the number of originals, sizes of the originals and size of the recording sheet when said third mode is selected by said second selection means.

16. An image forming apparatus comprising:

feeding means for feeding a plurality of originals to an exposure position one by one; exposure means for exposing each original fed by said feeding means;

image forming means for forming an image of an original exposed by said exposure means, on a recording sheet;

mode selection means for selecting a mode in which images of the plurality of originals are formed at different positions of one side of a single recording sheet;

counter means for counting a number of the originals by operating said feeding means when the mode is selected by said mode selection means; and control means for controlling an operation of forming reduced images of the images of the plurality of originals on the single recording sheet on the basis of the counting result of said counter means.

17. An image forming method, comprising the steps of:
(a) selecting a mode in which reduced images of a plurality of originals are formed on a single recording sheet;
(b) counting a number of the originals by cyclically feeding the plurality of originals by feeding means when the mode is selected; and
(c) feeding the plurality of originals to an exposure position one by one and controlling an operation of forming the reduced images of the plurality of originals on the single recording sheet, according to the number counted in step (b).

* * * * *

UNITED STATES PATENT AND TRADEMARK OFFICE
CERTIFICATE OF CORRECTION

PATENT NO. : 5,475,475
DATED : December 12, 1995
INVENTOR(S) : Hideto Kohtani, et al.

It is certified that error appears in the above-indentified patent and that said Letters Patent is hereby corrected as shown below:

On the title page, item [54]

In the title, change the second occurrence of "IMAGE" to --IMAGES--.

Column 1, line 2, change "IMAGE" to --IMAGES--.

Column 5, line 56, change "02=}R3xy+R2·(y-x)}/y ....(1)" to --02={R3xy+R2·(y-x)}/y ....(1)--.

Column 10, line 34, delete "Ion the";
line 35, delete "basis"; and
line 45, change "said" to --wherein said--.

Column 11, line 40, change "based" to --based on--.

UNITED STATES PATENT AND TRADEMARK OFFICE
CERTIFICATE OF CORRECTION

PATENT NO. : 5,475,475

DATED : December 12, 1995

INVENTOR(S) : Hideto Kohtani, et al.

It is certified that error appears in the above-indentified patent and that said Letters Patent is hereby corrected as shown below:

```
        Column 12, line 53, between "one;" and "exposure",
insert a paragraph indention
```

Signed and Sealed this

Ninth Day of April, 1996

Attest:

BRUCE LEHMAN

Attesting Officer

Commissioner of Patents and Trademarks